United States Patent [19]
Thoman

[11] 3,884,007
[45] May 20, 1975

[54] HERMETIC SEAL AND METHOD

[75] Inventor: Daniel Laverne Thoman, 42 Ridgeview Dr., Leola, Pa. 17540

[73] Assignee: RCA Corporation, New York, N.Y.

[22] Filed: June 20, 1974

[21] Appl. No.: 481,206

[52] U.S. Cl. .............. 52/624; 52/208; 52/759; 65/59; 156/60; 313/475
[51] Int. Cl. ...... E04c 2/54; G02b 5/14; C03c 17/30
[58] Field of Search ...... 52/759, 208, 624; 403/179; 65/59; 156/60; 29/25.13; 313/475

[56] References Cited
UNITED STATES PATENTS

| | | | |
|---|---|---|---|
| 3,226,589 | 12/1965 | Woodcock | 313/475 |
| 3,335,310 | 8/1967 | Ney | 52/759 X |
| 3,475,076 | 10/1969 | Nelson | 313/475 X |

*Primary Examiner*—Alfred C. Perham
*Attorney, Agent, or Firm*—G. H. Breustle; R. J. Boivin

[57] ABSTRACT

An annular metal flange portion of a member is concentrically arranged with respect to a glass cylindrical member and is reliably sealed to a side wall surface of the glass member by a hermetic sealing glass formed within an accumulation cavity between the metal and glass member. A compressive member is provided within the cavity for applying a compressive force during assembly against glass sealant material, and sealing glass formed therefrom, disposed within the cavity. A compressive force is applied to the compressive member during a heating operation of the sealing method for removal of liquid carriers of the glass sealant material and for hermetically sealing glass particles of that material. Compensation for shrinkage of the glass sealant material, and the sealing glass formed therefrom, during that heating operation is thereby provided. Also, the formation of bubbles and voids within the glass sealant material, and the sealing glass formed therefrom, is substantially avoided.

16 Claims, 2 Drawing Figures

HERMETIC SEAL AND METHOD

BACKGROUND OF THE INVENTION

The invention disclosed herein was made in the course of, or under a contract or subcontract thereunder with the Department of the Army.

The present invention relates to seals and their methods of formation, wherein facing spaced apart surface portions of two members are reliably sealed by sealing glass and, more particularly, to such seals and methods which may be used in the hermetic assembly of various component members, or parts, of vacuum containing electron discharge devices.

One application in which reliable hermetic seals are required is in the assembly of glass and metal components of proximity focussed image tubes. In such devices, the side-wall peripheral surface of a cylindrical fiber optic member must usually be hermetically sealed in telescopic relation to concentric annular metal rings or mounting flanges. Prior art seals of this type have generally required time consuming and costly repetitive sealing steps to avoid significant scrap costs associated with defective seals. Ordinarily these defective seals result from shrinkage, and/or bubble or void formations, within glass sealant material or the sealing glass formed therefrom, between the two members which occur in assembly during the sealing process. For this reason, seals of this type have generally necessitated the costly formation of a mounting shoulder, for such rings or flanges, on a sidewall portion or the outer cylindrical peripheral surface of the fiber optic glass member. Such shoulders may be formed, for example, by the removal of another portion of that outer sidewall surface. In this and other applications, it is desired to provide a simplified and more reliable hermetic seal of reduced cost between two or more members, directly, without the necessity of providing costly additional processing operations, such as, for example, the removal of portions of the sidewall surface of one of the members.

SUMMARY OF THE INVENTION

A sealing portion of a first member is proximately positioned with respect to a sealing portion of a second member and reliably hermetically sealed thereto by a sealing glass within an accumulation cavity formed between the sealing portions. During assembly, a means is provided for applying a compressive force against glass sealant material which is disposed within the cavity, and from which the sealing glass is formed. By applying a compressive force against the compressive means, in a hermetic sealing operation during the period of time that the sealing glass is being formed and the sealant material is viscous, compensation for shrinkage of the glass sealant material or the sealing glass may be provided and bubble and void formations within the glass sealant material or the sealing glass may be substantially avoided.

DETAILED DESCRIPTION

Figure 1:
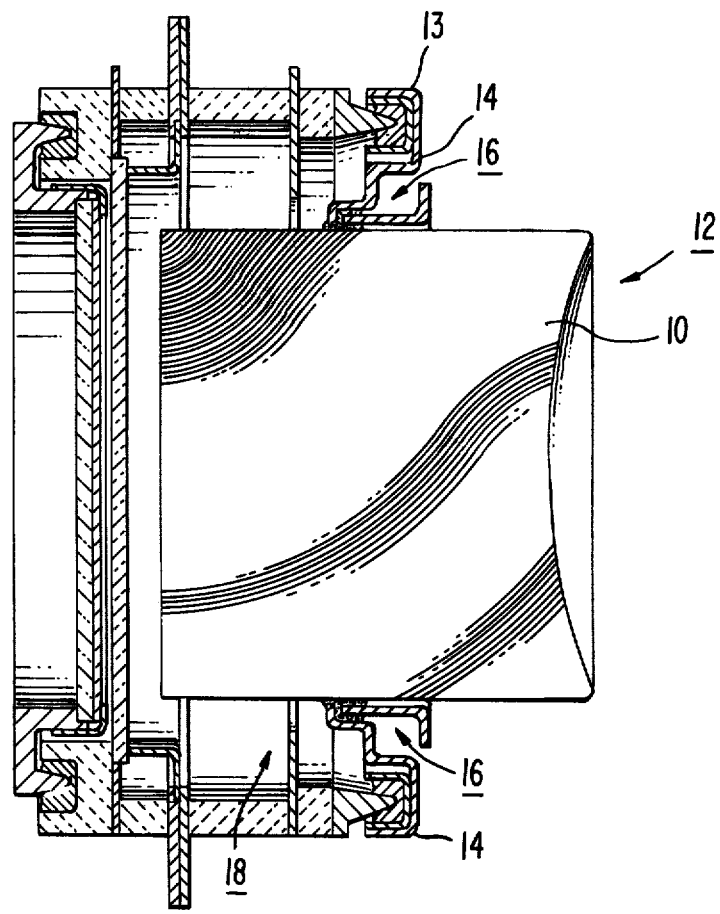
FIG. 1 is a cross-sectional view of an assembled proximity focussed image tube incorporating a hermetic seal made in accordance with the invention.

The Apparatus:

Referring to FIG. 1, there is shown an assembled embodiment of the invention wherein a cylindrical glass fiber optic member 10 of a proximity focused image tube 12 is hermetically sealed to one portion of an annular mounting flange 14 by means of a seal 16. Another portion 13 of the flange 14 is sealed to other hermetically sealed component members of the image tube 12, by prior art methods, in concentric fashion, to form a dish-like vacuum containing cavity 18, therewith, within which the fiber optic member 10 is hermetically sealed in telescopic relation.

The invention resides in providing a hermetic seal between a surface portion of the metal mounting flange 14 and a facing surface portion of the glass fiber optic member 10.

Figure 2:
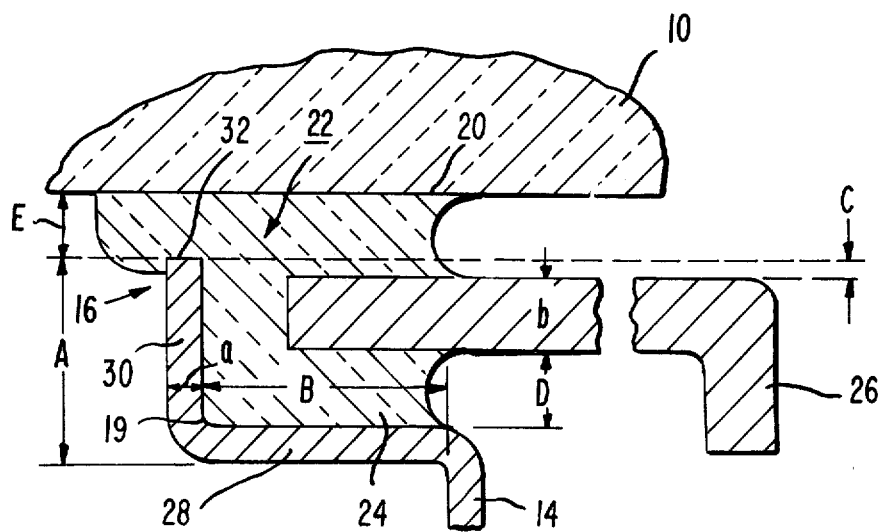
FIG. 2 is a cross-sectional fragmentary blow up of a seal region of the device depicted in FIG. 1.

Referring to FIG. 2, a contoured surface portion 19 of the mounting flange 14 is concentrically arranged telescopically around a peripheral sidewall surface 20 of the member 10. The flange 14 includes a cylindrical portion 28 which extends concentrically about a portion of surface 20 lengthwise with a substantially uniform length of B. Flange 14 also inlcudes a radial portion 30 which extends inwardly from an edge of cylindrical portion 28 toward the surface 20 a distance of A, and includes a terminal sealing edge 32. The radial portion 30 extends substantially perpendicularly toward the peripheral surface 20 and proximately "abuts" that surface at a substantially uniform distance of E. A sealing gap is thereby formed between the surface of the terminal sealing edge 32 and the peripheral sidewall surface 20 of the fiber optic member 10.

The inner surfaces of flange portions 28 and 30, which face, or extend perpendicularly toward, the peripheral surface 20, together form a substantially L-shaped surface region of the contoured surface portion 19. This L-shaped surface region, and the surface of the terminal sealing edge 32, together comprise the contoured surface portion 19.

Surface portion 19 cooperates with the facing peripheral surface 20 to form an accumulation cavity 22 between the flange 14 and fiber optic member 10. A sealing glass 24 is disposed within the accumulation cavity 22 and provides a hermetic seal between flange 14 and member 10 as hereinafter described. A cylindrically shaped compressive member 26 is interposed telescopically between member 10 and flange 14 within the sealing glass 24 and the accumulation cavity 22.

Flange portions 28 and 30 have a thickness $a$ which is selected to provide light weight and adequate support for the assembled image tube 12. In other regards, the physical size, and the surface contour of the flange portions 28 and 30, may be varied considerably without adverse effect, so long as an accumulation cavity 22 is formed by means of contoured surface portion 19 and surface 20 within which an adequate quantity of glass sealant material (from which sealing glass 24 is formed, during assembly) may be received, and, so long as, that sealant material is accessable to the compressive member 26, during assembly, to provide a hermeteic seal between the member 10 and the flange 14, as hereinafter described.

The sealing gap (i.e., distance E:) is preferably offset inwardly from an inner cylindrical surface of compressive member 26, a degree (I.E., distance C) sufficient to prevent a substantial quantity of the glass sealant material from escaping from the accumulation cavity 22 during the sealing operation hereinafter described. In general, the gap distance E provides a restricted means of escape for the sealant material 24 and for gases formed therein during the heating operation hereinafter described.

The Method:

Prior to assembly of the image tube 12, an adequate quantity of glass sealant material, from which the sealing glass 24 is formed, is formed as a viscous mass, as, for example, by mixing any one, or more, of numerous commercially available sealing glass powders, with suitable liquid carriers. The liquid carriers, are carefully selected to be easily removed during assembly as, for example, by air drying and/or heating operations. In general, the liquid carrier should include at least one binder, such as, for example, a nitrocellulose binder for retaining the sealing glass particles in a viscous mass, and may include one or more solvents.

Generally, the composition and viscosity of the sealant material must initially be adequate to provide for its placement during assembly, and its later retension as a mass, within the accumulation cavity 22. The preferable viscosity of the sealant material is "relative" since it depends largely on numerous factors such as, for example, the gap dimension E and the assembly aspect of device during the sealing operation hereinafter described. For example, a well known commercially available sealing glass powder composition may be mixed with a nitrocellulose binder and an air drying solvent such as, for example, amyl acetate, in a desired proportion to form a suitable mass of sealant material displaying an effective viscosity with which the sealant material may be easily disposed, for example, by mechanical means within the accumulation cavity 22. Subsequent to such placement as a viscous mass, the solvent may be removed by air drying. By suitable adjustment of the mixed proportions of the constituent materials of the sealant material, prior to assembly, a relatively bound but considerably less viscous mass of the sealant material may be formed within the cavity after such air drying which is more easily retained within the accumulation cavity 22.

In order to hermetically seal the flange 14 to the sidewall peripheral surface 20 of glass member 10 by forming the sealing glass 24, the following steps are performed in the assembly of the device:

a. The sealing edge 32 of the radial flange portion 30 is concentrically positioned (i.e., concentrically aligned and retained in such aligned position) about the peripheral surface 20 in a manner whereby a substantially uniform gap of dimension E is obtained.

b. Adequate glass sealant material, in a viscous state, is then disposed and substantially retained within the accumulation cavity 22 defined between contour surface portion 19 of the flange 14 and the peripheral surface 20.

c. A portion of compressive member 26 is thereafter positioned in abutting relation to the glass sealant material within the cavity 22. For example, a tube-like cylindrical portion of the member 26 may be partially inserted into the glass sealant material and positioned in telescopic concentric relation to the glass member 10 between the flange portion 28 and the peripheral surface 20.

d. The assembly accomplished in steps a–c is maintained in the alignment described and the assembly is heated, as a unit, to suitable temperatures and periods of time sufficient to: (1) drive off solvents, binders and/or other components of the liquid carrier of the glass sealant material; and, then, (2) hermetically seal together the sealing glass particles of the glass sealant material, to form the hermetically sealed sealing glass 24 and to hermetically seal flange 14 to member 10. An evenly distributed conjoining force is simultaneously applied between the flange 14 and the compressive member 26, during the period of time of the heating operation in which the glass sealant material is viscous.

In this manner, an effective amount of compressive force is applied to the sealant material by means of the compressive member 26 during that time period to provide compensation for shrinkage of that material, or the sealing glass formed therefrom, and to avoid gas bubble and void formation therein which could otherwise contribute to loss of seal integrity.

General Considerations:

Material compositions for flange 14, compressive member 26, and sealing glass 24 are preferably selected which display thermal coefficients of expansion slightly exceeding the thermal coefficient of expansion displayed by the material composition of the surface 20 of member 10. This selection of materials insures that the glass member 10 will be retained in compression upon cooling to ambient temperatures subsequent to the heating operation herein described, thereby assisting in maintaining the hermetic integrity of the seal.

The dimensions C and E are considered somewhat critical in that they are functionally interelated to: each other; the relative viscosity of the sealant material disposed within the accumulation cavity; and to the physical dimensions of the flange 14, glass member 10, and compressive member 26. In general, however, considerable variation and adjustment of these and other dimensions may be provided to advantage by slight experimentation and/or adjustment by persons skilled in the art. For example, the thickness of the compressive member 26 (dimension $b$) may be varied considerably without adverse effect, so long as the displacement of the glass sealant material by member 26, within the cavity 22, is adequate to compensate for shrinkage of the sealant material, or the sealing glass, and is adequate to avoid formation of bubbles and voids within those materials during the assembly heating operation previously described.

As used herein the term "sealing glass" is intended to describe a material state for the sealant material in which a desired degree of hermeticity of that material is achieved during assembly, by means of the previously described heating operation. Conversely, the term "sealant material" is intended to describe, broadly, the material state(s) achieved, during assembly, by the sealant material, from the time of original preparation to the time during such heating operation in which such hermeticity is achieved.

Examples:

Reliable hermetic seals, of the type described, have been repeatedly accomplished between 0.75 inch diameter cylindrical fiber optic members 10 and abutting flange portions 14 for image tubes constructed in the manner shown in FIG. 1. Typical dimensional values for the novel seal portions of these devices were established in accordance with the criteria herein described.

These values are given in the table below. Acceptable variations of these values, for this particular device, were also estimated and are shown parenthetically for the described device. Where appropriate, additional less critical criteria are also described as constraints on dimensional selection.

| Dimension in Inches | Estimated Acceptable Range In Inches And Additional Selection Criteria |
|---|---|
| a = .015" | (.015–.040) |
| b = .025" | (.015–.040) |
| A = .050" | (Selected to provide adequate sealing area between the flange 14 and the fiber optic member 10). |
| B = 0.150" | (Chosen to exceed length of insertion of member 26 into cavity 22 and to provide adequate sealing area between flange 14 and member 10. |
| C = 0.005" | (.001–.017) |
| D = 0.003" | (.001–.010) |
| E = 0.007" | (.005–.008) |

For devices constructed in accordance with these "typical" dimensional values, the flange portion 14 and compressive member 26 were each formed of nickle-iron controlled expansion alloy material having a material composition possessing a thermal coefficient of expansion substantially equivalent to that effectively displayed by surface 20 of the fiber optic member 10. A suitable sealing glass powder for the sealant material was found, for example, to comprise a devitrifying sealing glass powder. One such sealing glass powder is a "Pyroceram" brand cement powder, such as commercially available from Corning Glass Co. of Corning, N.Y. The sealing glass powder was selected to possess a thermal coefficient of expansion substantially corresponding to that effectively displayed by the surface 20 of the fiber optic member 10. This powder was suitably mixed with a liquid amyl-acetate-nitrocellulose liquid solvent and binder preparation in the ratio of approximately 8 to 1, by weight, to obtain a relatively viscous mass of sealant material 24 for the assembly of the devices in the manner previously described. The amyl-acetate solvent was removed during assembly by air drying. The nitrocellulose binder or carrier was thereafter driven off, and the sealing glass particles of the "Pyroceram" powder hermetically sealed, by heating the aligned assembly in a suitable alignment jig within a furnace programed to heat the aligned seal assembly in accordance with the following heating schedule: (1) heating the assembly to a temperature about 350° at a programed rate of about 3°C per minute; (2) maintaining that temperature for approximately 30 minutes; then, (3) heating the assembly to about 540°C. at a programed rate of about 7° C. per minute; thereafter, (4) maintaining that temperature for approximately 30 minutes, and subsequently (5) cooling the completed assembly. During steps (1)–(4), a washer-shaped weight of approximately 245 gr. was positioned against an exposed radial extending disc shaped surface of compressive member 26, to exert a substantially uniform gravitational force against the frit sealant material within the cavity 22.

The invention not only provides a repeatable and reliable hermetic sidewall seal between metal and glass members subsequent to the formation of sealing glass 24, but additionally provides a convenient means of adjusting, as desired, the sealing surface area between the two members by, for example, varying the contour and length of the inwardly facing surface portion 19 of the flange 14 herein described.

Importantly, the inventive concept may be employed to equal advantage in the hermetic sealing of the surface portions of two or more non-cylindrically shaped members which are proximately positioned in substantially uniformly spaced apart relation.

What I claim is:

1. A hermetic seal between two or more members comprising:
    a. a first member having a first sealing surface portion;
    b. a second member having a second sealing surface portion including a contoured surface region proximately spaced apart from said first sealing surface portion, said first sealing surface portion in facing cooperating relation with said contoured surface region to form therebetween an accumulation cavity capable of substantially retaining viscous material disposed therein,
    c. sealing glass, within said accumulation cavity, hermetically sealing said first and second sealing surface portions,
    d. means abutting said sealing glass, within said accumulation cavity, capable of applying compressive force against the sealing glass to provide compensation for shrinkage, and to substantially avoid bubble and void formation, in said sealing glass, and the material from which it is formed, during hermetic sealing and formation of said sealing glass in assembly.

2. A hermetic seal in accordance with claim 1, wherein said contoured surface region of said second sealing surface portion includes:
    a cross-section wherein said contoured surface region defines a substantially L-shaped surface region which cooperates with said first sealing surface portion to form therebetween said accumulation cavity.

3. A hermetic seal in accordance with claim 2, wherein said second sealing surface portion includes:
    a terminal sealing edge surface portion, of said contoured surface region, more proximate to said first sealing surface portion than other portions of said contoured surface region, said sealing edge surface portion being spaced from said first sealing surface portion to form a substantially uniform gap therebetween capable of substantially restricting the flow of said sealing glass therethrough when said sealing glass is in a viscous state.

4. A hermetic seal in accordance with claim 3, wherein said first and second sealing surface portions comprise substantially facing surface portions of the peripheral surfaces of telescoped first and second members.

5. A hermetic seal in accordance with claim 4, wherein said peripheral surface of said first member comprises a cylindrical surface.

6. A hermetic seal in accordance with claim 5, wherein said means comprises:
    a compressive member having a cylindrical tubelike portion telescoping between said peripheral surface of said first member and a region of said contoured surface region less proximate to said first sealing surface portion than said terminal sealing edge; said tube-like portion including an inner and outer surface which abuts said sealing glass within said cavity.

7. A hermetic seal in accordance with claim 5, additionally comprising said first member including a peripheral sealing surface comprised of a glass material, and said second member comprising a metal flange.

8. A hermetic seal in accordance with claim 7, wherein the material composition of said sealing glass, flange, and compressive member are each selected to display substantially similar thermal coefficients of expansion, but slightly greater than the thermal coefficient of expansion displayed by said sealing surface of said first member.

9. A method of providing a hermetic seal between a surface portion of a first member and a facing surface portion of a second member, the facing surface portion of the second member including a surface contour region, comprising the steps of:
   a. positioning and retaining the surface contour region proximate to the surface portion of the first member in substantially uniform spaced-apart relation thereto, wherein said surface contour region includes a terminal edge portion more proximate to said first member than other portions of said surface contour region, said surface contour region cooperating with said surface portion of said first member to form therebetween a cavity capable of receiving and substantially retaining a viscous material composition;
   b. disposing a viscous composition of glass sealant material, which includes particles of a sealing glass dispersed within at least one liquid carrier, within said receiving cavity;
   c. applying a substantially uniform compressive force against said glass sealant material by means of a compressive member while simultaneously heating the assemblage formed by steps (a-b) as an aligned unit to a temperature and time period sufficient to remove said liquid carrier and to form sealing glass by hermetically sealing together the sealing glass particles of said sealant material.

10. The method of claim 9, wherein step (c) additionally includes:
   applying an effective amount of force to said glass sealant material during said time period, whereby compensation for shrinkage of said glass sealant material and sealing glass is substantially provided, and whereby gas bubbles and void formations within the glass sealant material and sealing glass are substantially avoided.

11. The method of claim 9, additionally including the step of:
   forming said glass sealant material as a viscous mass comprising particles of sealing glass disposed within at least one liquid binder, said mass having a viscosity permitting substantial retension of said sealant material, disposed in step (b), within said cavity during step (c).

12. The method of claim 11, wherein said glass sealant material includes a nitrocellulose binder and an air drying solvent, the method additionally including the step of substantially removing said solvent by air drying the assembly after accomplishing step (b), but prior to accomplishing step (c).

13. The method of claim 9, wherein said terminal edge portion is proximately spaced-apart from the surface portion of said first member and forms a substantially uniform sealing gap between said surface portion of said first member and said edge portion of said second member, step (c) of the method additionally comprising restrictingly forcing a portion of said sealant material through the sealing gap, during said time period, by said compressive force.

14. The method of claim 13, wherein step (c) of the method additionally comprises:
   applying an effective amount of force against said glass sealant material during said time period, whereby compensation for shrinkage of said glass sealant material and sealing glass is provided, and whereby gas bubbles and void formation within the glass sealant material and sealing glass is substantially avoided.

15. The method of claim 9, wherein said surface portion of said first member comprises a peripheral wall surface thereof, step (a) of the method additionally comprising positioning said surface portions of said first and second members in telescopic substantially uniformly spaced-apart concentric relation.

16. The method of claim 15, wherein said peripheral wall surface of said first member comprises a glass material and wherein said second member comprises a metal material, the method additionally comprises:
   selecting the material composition for said sealing glass, said second member, and said compressive member, which display substantially similar thermal coefficients of expansion; and selecting a material composition for said first member, wherein the integrity of the hermetic seal is maintained partially by compression between said first and second members whenever the assemblage formed in steps (a-c) is cooled to a temperature below the hermetic sealing temperature of said sealing glass particles.

* * * * *